Sept. 21, 1948.  W. M. GILMAN  2,449,893
CLUTCH AND BRAKE MECHANISM
Filed Aug. 22, 1945  4 Sheets-Sheet 1

Inventor:
Wilbert M. Gilman
By Brunning and White
Attorneys.

Sept. 21, 1948.  W. M. GILMAN  2,449,893
CLUTCH AND BRAKE MECHANISM
Filed Aug. 22, 1945  4 Sheets-Sheet 2

Inventor:
Wilbert M. Gilman
By Arrington and White
Attorneys

Sept. 21, 1948. W. M. GILMAN 2,449,893
CLUTCH AND BRAKE MECHANISM
Filed Aug. 22, 1945 4 Sheets-Sheet 3

Inventor:
Wilbert M. Gilman
By Arrington and White
Attorneys.

Sept. 21, 1948.　　　　W. M. GILMAN　　　　2,449,893
CLUTCH AND BRAKE MECHANISM

Filed Aug. 22, 1945　　　　　　　　　　4 Sheets-Sheet 4

Inventor:
Wilbert M. Gilman
By Huningtonand White
Attorneys.

Patented Sept. 21, 1948

2,449,893

UNITED STATES PATENT OFFICE 2,449,893

CLUTCH AND BRAKE MECHANISM

Wilbert M. Gilman, Wellesley Hills, Mass., assignor, by mesne assignments, to Cread Engineering and Research Company, Cranston, R. I., a corporation of Rhode Island Application August 22, 1945, Serial No. 611,999

19 Claims. (Cl. 192—17)

This invention relates to improvements in clutches and particularly to the mechanism for controlling the operation thereof to connect a driving element to a driven element in a machine or other apparatus.

One object of the invention is to provide a high-speed clutch having improved clutching and declutching means capable of operation to connect a driving element to a driven element without shock or jar and to disconnect the driven element from the driving element to promptly arrest rotation thereof.

Another object is to provide means for declutching the driven element from the driving element while preventing any reverse rotation of the parts liable to re-engage the clutch members.

Another object is to provide a clutch having relative axially movable clutch members adapted to be engaged to connect a rotary driving element to a rotatable driven element and to remain disengaged without frictional contact between the continuously rotating element and the operating means.

Another object is to provide clutch-operating mechanism having means for disengaging the clutch members and applying a braking force to the driven element to promptly arrest its rotation.

Another object is to provide clutch control mechanism operative to positively and completely disengage the clutch members before the braking means is applied to the driven element.

Another object is to provide clutch-operating mechanism of simple and compact construction, capable of positive action and free from wear and deterioration of the parts during long periods of use.

Further objects of the improvement are set forth in the following specification which describes a preferred form of construction of the present clutch-mechanism, by way of example, as illustrated by the accompanying drawings. In the drawings:

Figure 1:
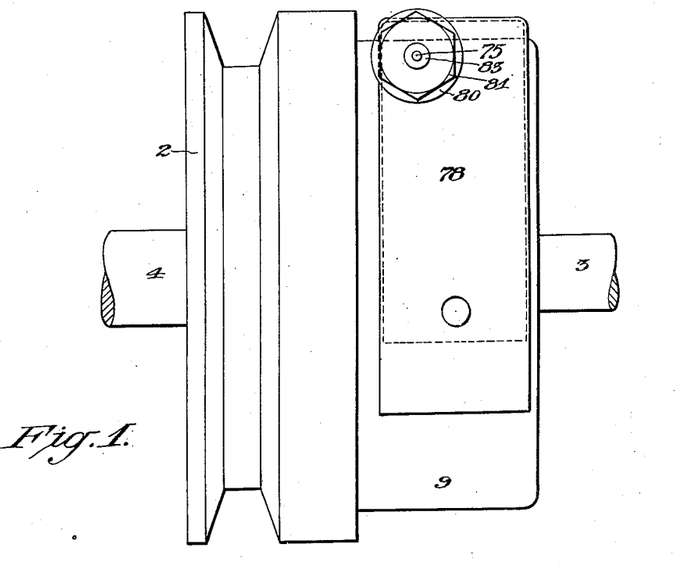
Fig. 1 is a general side view of the present improved clutch device shown with its operating mechanism enclosed in a housing or casing.
Figures 2, 10:
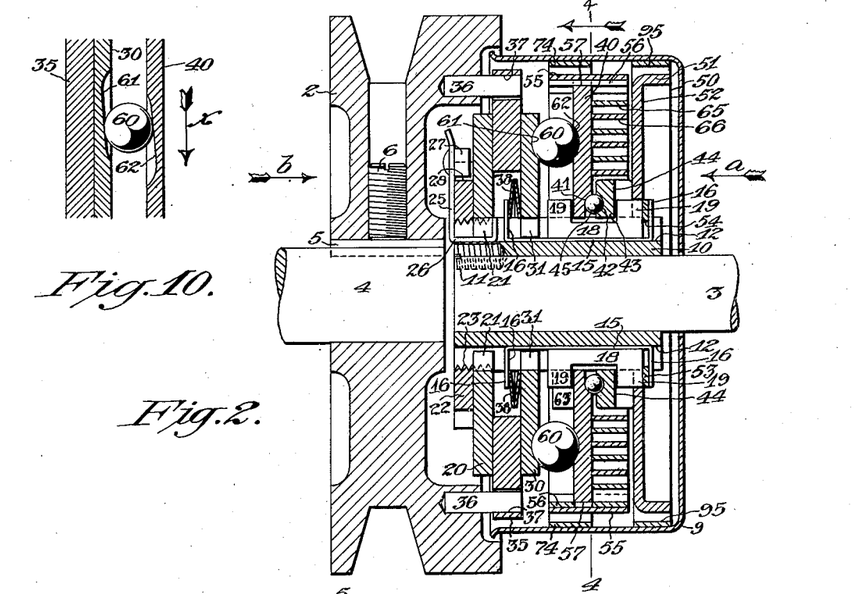
Fig. 2 is an axial sectional view of the clutch and its operating mechanism showing the clutch members engaged for connecting the driving element to rotate a driven element.
Fig. 10 is a detailed sectional edge view of the axially movable clutch member and its operating means showing the parts in operative relationship.
Figures 3, 11:
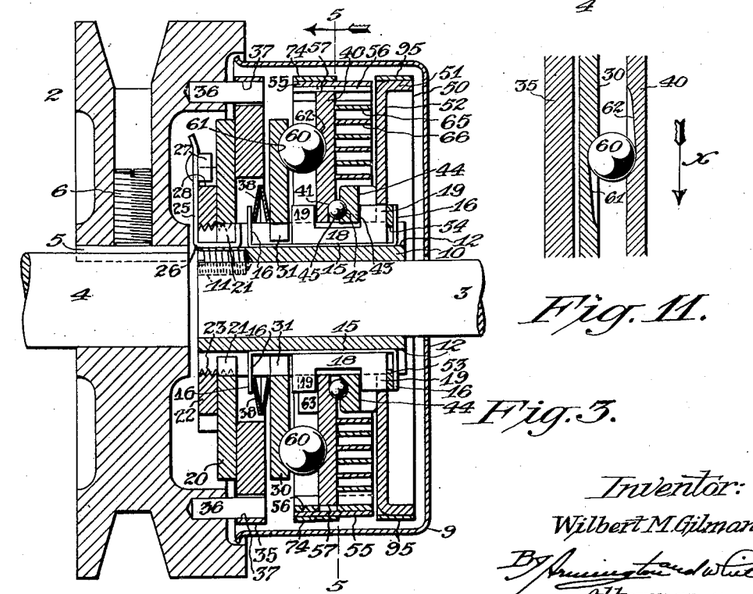
Fig. 3 is a similar sectional view showing the clutch members disengaged to release the driven element from connection with the driving element.
Fig. 11 is a similar view showing the same parts in inoperative relationship.

Referring particularly to Figs. 1, 2 and 3, the present improved clutch mechanism comprises a driving element which may be in the form of a pulley having a grooved periphery adapted to receive a V-type transmission belt for rotating said pulley and a driven member which may comprise a shaft 3 or other rotatable element. The driving pulley 2 may be mounted fast on a shaft 4 by means of a key 5 and set-screw 6 while the driven shaft 3 may be journaled in suitable bearings, not herein shown, to drive any type of machine or apparatus. The operating mechanism for the clutch is preferably enclosed in a generally cylindrical housing or casing 9 which may be constructed of sheet-metal and formed to a shape hereinafter more specifically described.

Mounted fast on the end of the driven shaft 3 is a hub 10 which constitutes the rotor for transmitting rotation between the driving pulley 2 and said shaft. The hub 10 may be keyed or otherwise secured fast on the shaft 3 as, for example, by means of a grub-screw 11 tapped into the end of the hub and the end of the shaft. The hub 10 is slotted longitudinally at two diametrically opposed points to provide for keying the rotary parts of the clutch mechanism thereto. Fitted to each slot or keyway 12 is an elongate, U-shaped element 15 having its major horizontal portion seated in the bottom of the slot with right-angular arms 16 projecting radially from opposite ends thereof. Each slot 12 also receives a shorter U-shaped key 18 having a horizontal base portion seated against the horizontal portion of the U-shaped element 15 with right-angular lugs 19 projecting radially from its ends. The slots 12, the U-shaped members 15 and the keys 18 serve for connecting the several clutch members and operating elements for rotation with the hub 10 and shaft 3.

Figure 7:
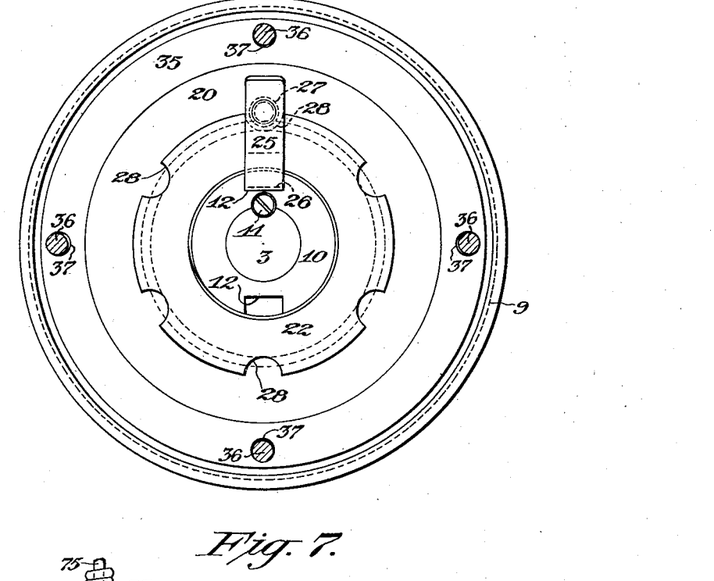
Fig. 7 is a detailed end view of the clutch-operating mechanism looking in the direction indicated by the arrow b in Fig. 2 and shown with the driving pulley removed to illustrate the adjusting means for one of the clutch members.

The clutch members which translate the rotary motion of the driving pulley 2 to the shaft 3 comprise a pair of annular disks 20 and 30 which are keyed to the hub 10. The disk 20 is mounted on the inner end of the hub 10 and formed with a pair of radial lugs or integral keys 21 engaging in the slots 12 in the hub. The disk 20 is held in fixed position on the hub 10 by means of a ring-nut 22 having internal threads engaging external threads 23 on the end of the hub. The position of the disk 20 may be adjusted axially of the hub 10 by turning the ring-nut 22 which is provided with means for locking it against relative rotation on the hub. Such means may consist of a spring member 25 having a loop portion 26 seated in the groove 12 of the hub 10 with one end engaging against one face of the disk 20 and its opposite end extending radially outward across the face of the ring-nut 22 with a cylindrical button-like stud 27 at its end. The button or stud 27 is adapted to engage in one of a series of notches 28 formed in the periphery of the ring-nut 22, see Fig. 7, to restrain the latter from rotation on the hub 10 after it has been turned to adjust the disk 20 axially of the hub. The opposite clutch member or disk 30 is mounted to slide axially on the hub 10 and formed with integral lugs or keys 31 engaging in the slots 12 to connect it rotatively therewith. The two clutch members or disks 20 and 30 are adapted to engage with the opposite faces of a friction ring 35 located therebetween and rotatively connected to the driving pulley 2. The friction ring 35 may be constructed of asbestos or other suitable friction material adapted to provide gripping contact thereof with the opposed faces of the disks 20 and 30. The friction ring 35 may be connected to the driving pulley 2 by means of pins 36 projecting from the side of the latter and engaging through holes 37 near the periphery of the ring to adapt it to float loosely between the disks 20 and 30.

It will be understood that the clutch-disk 30 is slidable axially on the hub 10 to adapt it to be carried into engagement with the side of the friction ring 35 to force the latter into face engagement with the fixed disk 20. Normally, the shiftable disk 30 is maintained in spaced relation to the friction disk 35 under the tension of a pair of Belleville springs 38, so called, encircling the hub 10, see Fig. 3. The springs 38 are in the form of annular sheet-metal members of concavo-convex or saucer-shape arranged in reverse relationship with their outer peripheries in contact and held under tension between the arms 16 of the members 15 and the side of the disk 30.

The shiftable disk 30 is carried into engagement with the friction ring 35 through the means of an operating disk or ring 40 which is adapted to be turned relatively thereto on the hub 10. The operating ring 40 is mounted free to rotate on the hub 10 between the lugs 19 of the keys 18, being maintained axially in position by means of a ball bearing surrounding the hub. The ring 40 is formed with a ball-race 41 located opposite to a cooperating race 42 in an annular bearing member 43 keyed rotatively with the hub 10 by means of the lugs 19 on the keys 18 which project into slots 44 in the sides of the bearing member. A series of balls 45 in the races 41 and 42 take the thrust of the operating ring 40 in one direction axially of the shaft 3, see Figs. 2 and 4. The thrust of the bearing ring 43 in this direction is taken by a brake-drum 50 against the side of which the ring engages. The brake-drum 50 is mounted on the hub 10 and keyed thereto by means of the lugs 19 on the keys 18 engaging radial slots in the drum. The brake-drum 50 is constructed with a cylindrical flange 51 supported at the periphery of the disk-like radial portion 52, being held in place axially of the hub 10 by means of a spring-ring or split washer 53. The spring-ring or split washer 53 is of usual type to adapt it to be sprung into an annular groove 54 at the end of the hub 10 whereby to resist the axial thrust of the brake-drum 50 and also hold the U-shaped members 15 from axial movement in the keyways 12 in the hub to take the thrust of the Belleville springs 38 at the opposite end of said member.

The operating ring 40 carries a peripheral flange or drum-annulus 55 adapted for engagement by a brake band, later described, to snub the ring to retard its rotation. The rim or annulus 55 encircles the outer periphery of the ring 40 and is welded or otherwise secured thereto. Bifurcated strips 56 received in slots 57 in the periphery of the ring 40 underlying the rim 55 at diametrically opposite points are formed with inwardly bent ends 58 straddling the sides of the rim to provide fastening means for the ends of a pair of spiral springs 65 and 66, see Figs. 2, 3 and 6, which are more particularly described hereinafter.

The operating ring 40, as before noted, constitutes the means for controlling the engagement between the disks 20 and 30 and the friction ring 35. The ring 40 is connected to slide the disk 30 axially through the medium of four relatively large hardened balls 60 held in kidney-shaped tapered recesses or depressions 61 and 62 in the disk and ring, respectively, see Figs. 4, 5, 10 and 11. Referring to these latter views, the recesses or depressions 61 and 62 are coined into the opposing faces of the disk 30 and ring 40 and disposed in reverse relationship with respect to their deeper portions. This provides that when the disk 30 and ring 40 are in normal relationship rotatively during disengagement of the clutch members as shown in Fig. 3, the balls 60 will be pocketed in the deeper portions of the recesses 61 and 62 as represented in Fig. 11. When, however, the ring 40 is rotated relatively to the disk 30 in the direction indicated by the arrow $x$ in Figs. 10 and 11 the balls 60 will be caused to travel into the shallower portions of the recesses 61 and 62, thereby wedging the disk 30 laterally away from the ring 40 to carry it into engagement with the friction ring 35 and force the latter against the face of the fixed disk 20. The recesses 60 and 61 are so dimensioned that the balls 60 will not move clear to the ends thereof during this action and consequently a firm thrust always will be exerted by the ring 40 on the disk 30, while at the same time providing for wear on the engaging surfaces between the balls and the bottom of the recesses. It will be understood also that when the operating ring 40 is turned relatively to the disk 30 in the opposite direction from that first described the balls 60 will travel to the deeper ends of the recesses 61 and 62 to permit the disk 30 to be shifted away from the friction ring 35 under the thrust of the springs 38. A pair of detent blocks 63 welded or otherwise suitably secured to the side of the operating ring 40, see Figs. 2, 3 and 5, are adapted to engage with the lugs 19 on the keys 18 to limit the reverse rotation of the ring on the hub 10 as indicated by dotted lines in Fig. 5.

Figure 6:
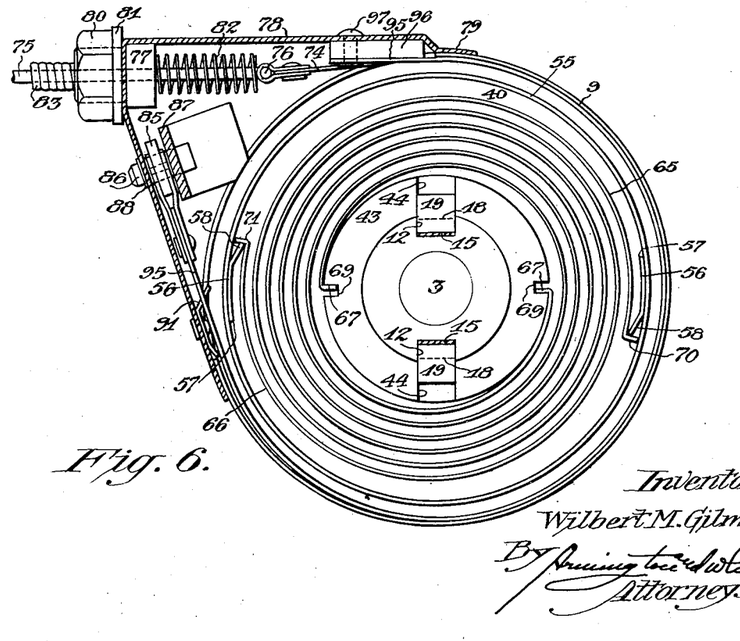
Fig. 6 is an end view looking in the direction indicated by the arrow a in Fig. 2, part sectional through the housing to illustrate the clutch springs which actuate the clutch ring to cause engagement between the clutch members.

The means for rotating the operating ring 40 relatively to the disk 30 to cause it to effect engagement between the clutch disks 20 and 30 and the friction ring 35 comprises a pair of spiral springs 65 and 66, previously referred to and shown most clearly in Fig. 6. The inner ends of the two springs 65 and 66 are anchored to the hub 10 by means of the bearing ring 43, the ends of the springs being bent inwardly at 67 to engage in slots 69 in the periphery of the bearing ring. The two springs 65 and 66 encircle the hub 10 spirally in the same direction with their coils in alternate overlying relationship, as shown in Fig. 6, and with the outer end of each spring connected to the inner face of the annular rim 55 on the operating ring 40. The means for connecting the outer ends of the springs 65 and 66 to the annular rim 55 of the ring 40 consists in the inwardly-bent ends 58 of the strips 56, previously referred to, which engage the hooked ends 70 and 71 of the springs. The two springs 65 and 66 being anchored to the hub 10 at diametrically opposite points and fastened to the ring 40 at opposite points tend to balance the radial thrust on the hub 10 and shaft 3.

When energized the springs 65 and 66 tend to rotate the operating ring 40 in contraclockwise direction as viewed in Fig. 6 to maintain the ring in position to cause the balls 60 to exert a thrust on the clutch member 30 to engage it with the friction ring 35 and the latter with the disk 20, see Figs. 3 and 11. When, however, the operating ring 40 is snubbed by means of a brake band, to be described later, its rotation with the hub 10 is retarded to cause it to be moved into the relationship shown in Fig. 11 so that the balls 60 will ride into the deeper portions of the recesses 61 and 62 whereof to effect disengagement of the clutch members. When the snubbing action is released the springs 65 and 66 will become active again to rotate the operating ring 40 into position to carry the balls into the shallower portions of the recesses 61 and 62 to exert a thrust through the balls to move the disk 30 to force the friction ring 35 against the fixed ring 20. This method of clutching and declutching the members is referred to more specifically in the explanation of the operation of the complete device.

Figure 4:
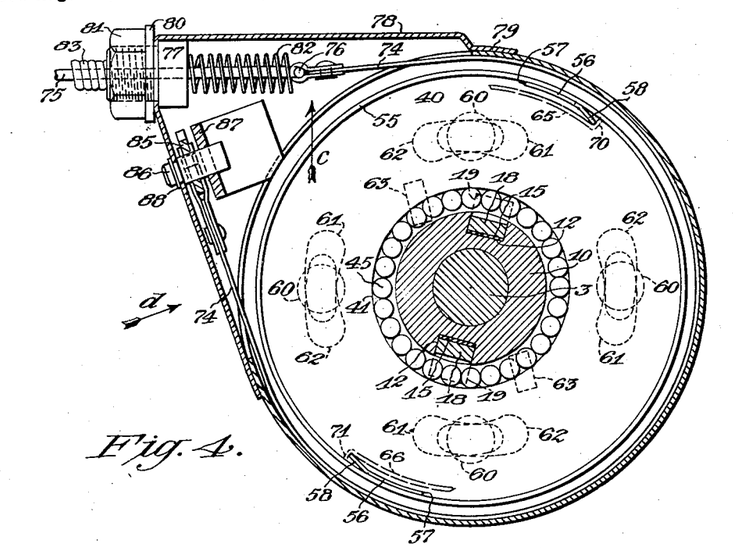
Fig. 4 is a part-sectional end view on line 4—4 of Fig. 2 showing the snubbing band and brake band as released when the clutch members are engaged to drive the driven member from the driving member.
Figure 5:
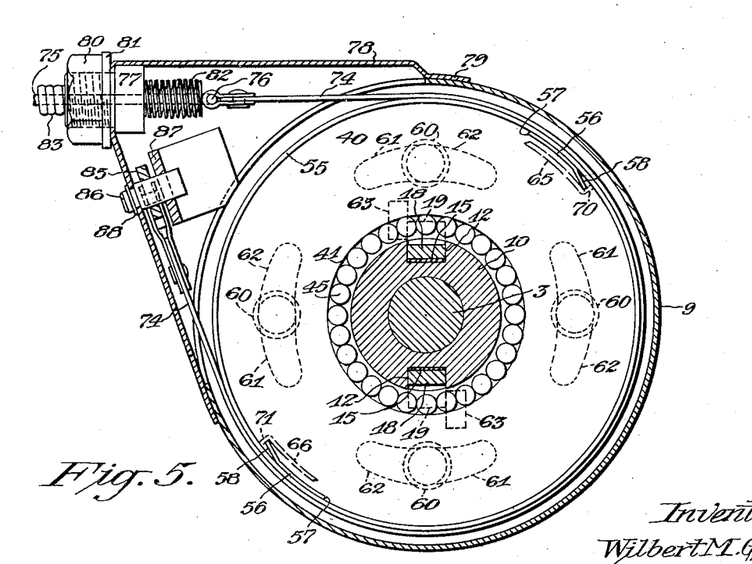
Fig. 5 is a similar sectional view on line 5—5 of Fig. 3 showing the snubbing band and brake band as engaged with their respective drums to effect disengagement of the clutch members and arrest the rotation of the driven element.

For snubbing the operating ring 40 a resilient brake band 74 is provided which is normally inactive or at rest against the inner face of the casing 9, as shown in Fig. 4, and is adapted to be tightened against the annular rim 55 of the operating ring, see Fig. 5. The brake band 74 is adapted to be operated manually or otherwise by means of a Bowden wire 75 which may have a force applied thereto by a lever or other suitable means, not shown herein. The Bowden wire 75 is connected at 76 to one end of the band 74, being arranged to slide through a thimble-like bearing 77 mounted in an extension 78 of the cylindrical casing 9, it being understood that the casing 9 is fixedly attached to some stationary part of the machine or apparatus in which the clutch is used. The casing-extension 78 is of triangular shape, having one end welded to the top of the casing 9 at 79 with its opposite end welded or otherwise suitably secured thereto adjacent its bottom portion; the casing having an arcuate opening extending between the ends of the extension. The thimble-bearing 77 projects through an opening in the casing-extension 78 with a nut 80 screwed onto its threaded portion to bind against a washer 81 encircling the opening in the casing-extension. A helical spring 82 encompasses the inner end of the Bowden wire 75, bearing against the end of the thimble 77 and engaging the end of the band 74 to normally maintain the latter in extended and released relationship as shown in Fig. 4. The Bowden wire 75 is adapted to slide through a sheath 83 of usual form and may have its end connected to a lever or other device for exerting a pull thereon. The opposite end of the band 74 is anchored to one end of a lever 85, see Fig. 9, pivoted on a stud 86 projecting through the side of the casing-extension 78 with its inner end supported in an angle-shaped bracket 87 which is welded or otherwise suitably secured to the side of the casing-extension, see Fig. 4. The stud 86 has a reduced end which engages through a hole in the side of the casing-extension 78 and is secured in place by a spring ring 88 engaging a groove therein. A brake band 95 connected at 92 to one end of the lever 85 is normally expanded into engagement with the inner face of the cylindrical casing 9 at the side of the band 74, see Fig. 2. The lever 85 may be maintained in the position shown in Fig. 9 by means of a helical spring 90 anchored at 91 to the side of the casing-extension 78, although the use of such a spring is unnecessary when the brake-band 85 is sufficiently resilient to maintain it expanded. The opposite end of the brake band 95 is anchored to a block 96 by means of a rivet 97 which projects through the upper portion of the casing-extension 78 and is headed over thereagainst. It is to be particularly noted that the points of attachment of the respective brake bands 95 and 74 to the lever 85 are at radii with respect to the axis of the lever 85 in a ratio of approximately two to one. That is to say, the brake band 95 is connected to the lever 85 at a distance from its axis twice that of the point of connection of the brake band 74 therewith. This arrangement acts as follows: As the brake band 74 is brought into engagement with the annular rim of the operating ring 40, to snub the latter, the brake band 95 is simultaneously tightened against the rim of the brake drum 50, so that when the clutch members are completely disengaged the operating ring 40 and the brake drum 50 will be maintained in their corresponding relative positions. This prevents the clutch springs 55 and 65 from rotating the driven system in reverse direction which would cause re-engagement of the clutch. The tightening of the brake band 95 against the brake drum 50 also serves to bring the driven member to rest rapidly. The method of operation of the device is as next explained:

Assuming that the clutch is engaged to cause the driving pulley 2 to rotate the driven element or shaft 3 therefrom, declutching thereof is effected by the application of a force to the Bowden wire 75. The brake band 74 attached to the Bowden wire 75 will accordingly be brought into frictional engagement with the annular rim 55 of the operating ring 40 to retard the rotation of the latter with respect to that of the driven elements of the clutch. This applied control force is multiplied by the snubbing ratio to a greater force which acts on the brake band lever 85 tending to rock it on its pivot 86 so that the force thus applied to the lever is translated to the brake band 95 in magnitude reduced by the respective lengths of the lever arms as determined by the points of attachment of the bands thereto. The lever 85 is thus caused to engage the brake band 95 with the rim 51 of the brake drum 50 to bring the driven element of the clutch to rest, acting in parallel with the torque exerted on the operating ring by the brake band 74. However, as the braking action is applied to the drum 50 the snubbing of the operating ring 40 causes disengagement of the clutch members to release the driven element of the clutch from the driving element or pulley 2. As the rotation of the operating ring 40 is retarded against the balancing action of the spiral springs 65 and 66 the balls 60 will be caused to travel into the deeper portions of the grooves 61 and 62 to release their pressure on the shiftable clutch disk 30. Stated another way, as the disk 30 continues to rotate with the hub 10 in the direction indicated by the arrow $x$ in Fig. 10, its movement relatively to the operating ring 40 during the snubbing of the latter will cause the balls 60 to travel into the deeper portions of the recesses 61 and 62 to release their pressure on the shiftable clutch disk 30. That is to say, as the disk 30 continues to rotate with the hub 10 in the direction indicated by the arrow $x$ in Fig. 10, its movement relatively to the operating ring 40 during the snubbing of the latter will cause the balls 60 to travel into the deeper portions of the recesses 61 and 62 as shown in Fig. 11. The snubbing action on the operating ring 40 will cause its detent blocks 63 to become engaged by the lugs 19 on the keys 18 to prevent continued displacement between the operating ring and the hub 10, but in the meantime the brake band 95 comes into action to arrest the rotation of the driven elements. Under this action the springs 38 will act to shift the disk 30 to the right, as viewed in Fig. 2, whereby to release it from the friction ring 35 as illustrated in Fig. 3. The shifting of the clutch ring 30 in this manner releases it from the friction ring 35 so that the latter is released from the fixed drive ring 20. The friction ring 35 will thus be freed to float between the two clutch disks 20 and 30 so that the driving pulley 2 will be declutched from the rotor 10 and shaft 3; the declutching action taking place before the brake is applied as before explained. When the entire system comes to rest the springs 65 and 66 will assert a torque attempting to drive the load backward to re-engage the clutch, but this tendency is opposed by the snubbing action of both brake bands which act in series to prevent reverse rotation of the parts.

The relative magnitude and the direction of the forces involved in the clutch operation are noted as follows: Assuming a force of ten pounds applied to the Bowden wire control means, and a multiplying ratio of two for each brake band (actual values for the proportions indicated would be between two and three), the force applied by the first brake band 74 to the lever 85 would be twenty pounds. The corresponding force translated to the end of the second brake band 95 by the lever 85 would be ten pounds in accordance with the assumed ratio between the lengths of the lever arms. The force at the fixed anchor 96 for the second brake band 95 is one-half of that at its connection to the lever 85 or five pounds. Accordingly, while the driven elements of the clutch are coming to rest the net braking force on the operating ring 40 is twenty-less-ten or ten pounds and on the brake drum 50, ten-less-five or five pounds. This differential assures an initial displacement of the operating ring 40 with respect to the rest of the rotating clutch elements and hence complete disengagement of the clutch members when the Bowden wire is first operated. Moreover, this selective operation is doubly assured by the fact that the moment of inertia of the operating ring 40 is relatively light as compared with the rest of the driven elements of the clutch, so that even if the retarding tangential forces on the operating ring 40 and brake drum 50 were identical, preferential displacement of the operating ring would still occur.

At the instant the driven elements come to rest the tendency is for them to rotate in the opposite direction under the action of the clutch springs 65 and 66. However, this does not affect the forces acting at either end of the brake band 74 which respectively remain ten pounds and twenty pounds. The braking action of the second band 95 now is reversed in direction, however, and consequently the force of the anchor lever 85 is doubled instead of halved so that now it becomes twenty pounds. This produces a net force of ten pounds resisting back driving of the load and corresponds to the same force on the operating ring 40. Actually, the relative coefficients of friction of the two bands will assume values so that these opposing forces automatically equalize.

Figure 8:
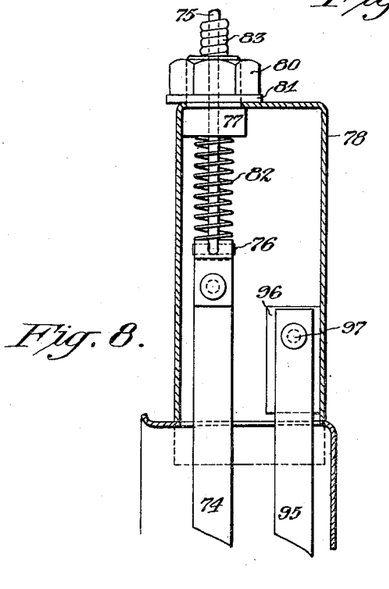
Fig. 8 is a detailed view of the mounting for the snubbing band and the brake band looking in the direction indicated by the arrow c in Fig. 4.
Figure 9:
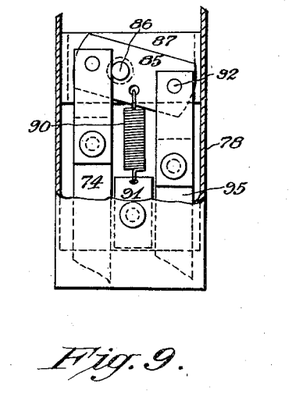
Fig. 9 is a detailed view of the lever connection between the snubbing band and brake band looking in the direction indicated by the arrow d in Fig. 4.

To re-engage the clutch members it is only necessary to release the force exerted on the Bowden wire 75 whereof the springs 82 and 90 will act to disengage both brake bands 74 and 95, see Figs. 6, 8 and 9, respectively with the rim of the operating ring 40 and the drum 50. Upon release of the operating ring 40 the clutch springs 65 and 66, which have been energized during the snubbing action of the operating ring, will rotate the ring 40 on the hub 10 in the direction indicated by the arrow $x$ in Fig. 11, thereby causing the balls 60 to travel into the shallower portions of the recesses 61 and 62. The clutch disk 30 thus will be shifted axially on the hub 10 to force it into engagement with the friction ring 35 and thereby frictionally engage the latter with the disk 20 fast on the hub. In this manner the clutch members will be brought into engagement to cause the driving pulley 2 to drive through the disks 20 and 30 to rotate the hub 10 and thereby the shaft 3.

It will be observed from the foregoing specification that the present invention provides a high speed clutch having improved clutching and declutching means which may be operated without shock or jar on the rotating elements to arrest rotation of a driven member. It has been shown that the improved means for declutching the driven element from the driving element effectively prevents any reverse rotation of the load liable to re-engage the clutch members and consequently the control means operates smoothly and efficiently to avoid friction and wear on the parts. That is to say, means are provided for disengaging the clutch members and applying a braking force to the driven element to prevent reverse rotation thereof which would cause re-engagement of the clutch members. Still another important feature resides in the fact that the means for declutching the driven element from the driving element operates without causing friction and wear between the shiftable member of the clutch and the part employed to shift it. In fine, no relative stationary element having continuous engagement with a rotating member of the clutch is employed and therefore all friction and wear consequent to such usual arrangement is entirely eliminated.

While the present improved clutch is herein shown and described as embodied in a preferred form of construction by way of example, it is to be understood that various modifications may be made in the structure and arrangement of its parts without departing from the spirit or scope of the invention. Therefore, without limiting myself in this respect, I claim:

1. In a clutch mechanism, a rotary driving element, a rotatable driven element, clutch members engageable for connecting said driving element to rotate the driven element, an operating member rotatable relatively to said clutch members to engage said members, resilient means for relatively rotating said operating member, snubbing means to retard the rotation of the operating member to cause it to release the clutch members from engagement, and braking means for arresting the rotation of the driven element after the clutch members have been disengaged.

2. In a clutch mechanism, a rotary driving element, a rotatable driven element, clutch members engageable to rotatively connect said driving and driven elements, an operating member rotatable relatively to said clutch members, means actuated by the rotation of said operating member for engaging the clutch members, resilient means for relatively rotating said operating member to carry the clutch members into engagement, braking means for retarding the rotation of the operating member to cause it to disengage the clutch members, and separate braking means for arresting the rotation of the driven element after the clutch members have been disengaged.

3. In a clutch mechanism, a driving element, a driven element, clutch members engageable to drive the driven element from the driving element, an operating member rotatable with the driven element, means actuated by said operating member for engaging the clutch members, means operative to retard the rotation of the operating member with the driven element to cause it to release the engaging means to disengage the clutch members, and means operative simultaneously with the operation of the retarding means for arresting the rotation of the driven element as the clutch members are disengaged.

4. In a clutch mechanism, a rotary driving element, a rotatable driven element, clutch members engageable to connect the driving element to rotate the driven element, a rotatable operating member, wedging means between the operating member and the clutch members for effecting engagement of said members, resilient means for rotating the operating member relatively to the clutch members to actuate the wedging means, means to retard the rotation of the operating member to cause it to release the wedging means to disengage the clutch members, and means for applying a braking force to the driven member to prevent reverse rotation thereof which would cause re-engagement of the clutch members.

5. In a clutch mechanism, a rotary driving element, a rotatable driven element, a clutch member rotatable with the driving element, a second clutch member rotatable with the driven element, an operating ring, wedging means actuated by relative rotation of said operating ring to force the clutch members into engagement, resilient means on the driven element operative to rotate the operating ring relatively thereto, means to resist rotation of the operating ring against the action of said resilient means to cause it to release the wedging means to disengage the clutch members, and means for applying a braking force to the driven element to prevent reverse rotation thereof which would cause re-engagement of the clutch members.

6. In a clutch mechanism, a rotary driving element, a rotatable driven element, a clutch ring rotatable with the driving element and movable axially relatively thereto, a clutch disk fast with the driven element, a second clutch disk rotatable with the driven element and shiftable axially thereof, resilient means for shifting said second clutch disk to maintain it free from engagement with the clutch ring, an operating ring rotatable relatively to the driven element, means between the operating ring and the second clutch disk operative to shift the latter to effect engagement between the clutch disks and the clutch ring, resilient means for rotating the operating ring relatively to the driven element to actuate the engaging means for the clutch disks and ring, and means to retard the rotation of the operating ring to cause it to release the engaging means to effect disengagement of the clutch disks and clutch ring.

7. In a clutch mechanism, a rotary driving element, a rotatable driven element, a friction ring rotatable with the driving element and movable axially thereof, a clutch disk fast with the driven element, a second clutch disk keyed to the driven element and shiftable axially thereof, an operating ring carried by the driven element and adapted for rotation relatively thereto, wedging means between the operating ring and the second clutch disk for forcing the latter against the friction ring to engage the latter with the first clutch disk, resilient means for rotating the operating ring relatively to the driven element to actuate the wedging means, and a brake for resisting rotation of the operating ring to cause it to release the wedging means to effect disengagement between the clutch disks and the friction ring.

8. In a clutch mechanism, a rotary driving element, a rotatable driven element, a friction ring rotatable with the driving element and axially movable relatively thereto, a clutch disk fast with the driven element, a second clutch disk keyed to the driven element and shiftable axially to engage the friction ring and engage it with the first clutch disk, said second clutch disk having tapered recesses in its side, an operating ring carried by the driven element and rotatable relatively thereto, said operating ring having tapered recesses in its side, balls between the operating ring and the second clutch disk engaging the tapered recesses in their sides, resilient means for rotating the operating ring to travel the balls in the recess to exert a thrust against the second clutch disk to engage it with the clutch ring and force the latter into engagement with the first clutch disk, and means for retarding the rotation of the operating ring to cause the balls to travel in the recesses to release the engagement between the clutch disks and the clutch rings.

9. In a clutch mechanism, a rotary driving element, a rotatable driven element, a clutch ring keyed to the driving element and adapted to float axially relatively thereto, a clutch disk fast on the driven element, a second clutch disk keyed to the driven element and shiftable axially thereof, an operating ring carried by the driven element and rotatable relatively thereto, said second clutch disk and operating ring having tapered recesses in their opposed faces arranged in reverse relationship, balls in the recesses of the second clutch disk and the operating ring, resilient means for rotating the operating ring to cause the balls to travel to the shallower ends of the tapered recesses to shift said second clutch disk to effect its engagement with the clutch ring and engagement of the ring with the first clutch disk, braking means for retarding the rotation of the operating ring to cause the balls to travel into the deeper portions of the recesses to release the engagement between the clutch disks and the clutch ring, and resilient means for shifting the second clutch disk axially to disengage it from the clutch ring.

10. In a clutch mechanism, a rotary driving element, a rotatable driven element, a clutch ring on the driving element, a clutch disk keyed to the driven element and shiftable axially to engage the clutch ring, an operating element carried by the driven element and rotatable relatively thereto, wedging means between the operating element and the clutch disk for shifting the latter into engagement with the clutch ring, a spiral spring anchored to the driven element at one end with its opposite end engaging the operating element to rotate the latter to actuate the wedging means whereby to shift the clutch disk into engagement with the clutch ring, a brake operative to retard the rotation of the operating element against the force of the spring to release the wedging means, and a second spring for disengaging the clutch disk from the clutch ring upon release of the wedging means.

11. In a clutch mechanism, a rotary driving element, a shaft adapted to be driven therefrom, a hub fast on said shaft, a clutch disk fast on the hub, a second clutch disk keyed to the hub and shiftable axially thereof, a clutch ring keyed to the driving element and arranged to float between the first and second clutch disks, an operating ring rotatable on the hub, wedging means between the operating ring and the second clutch disk, a pair of spiral springs anchored to the hub at one end with their opposite ends engaging the operating ring to rotate the latter, braking means for retarding the rotation of the operating ring to cause it to actuate the wedging means to shift the second clutch disk to engage the clutch ring and force it into engagement with the first clutch disk, a brake drum fast on the shaft, and a second braking means operative with the disengagement of the clutch disks and ring to arrest the rotation of the shaft.

12. In a clutch mechanism, a rotary driving element, a rotatable shaft, a hub fast on said shaft, a clutch disk keyed to the hub, means for adjusting said clutch disk axially of said hub, a second clutch disk keyed to the hub and slidable axially thereof, a clutch ring keyed to the driving element and adapted to float laterally between the two clutch disks, an operating ring mounted on the hub for relative rotation with respect thereto, wedging means operative by the relative rotation of the operating ring to shift the second clutch disk to effect engagement between the clutch disks and the clutch ring, a brake band for retarding the rotation of the operating ring, a brake drum fast with the hub, a second brake band for engagement with the brake drum, means for engaging the first brake band with the rim of the operating ring, and means operative therefrom to engage the second brake band with the brake drum to prevent reverse rotation of the driven element which would cause re-engagement of the clutch members.

13. In a clutch mechanism, a rotary driving element, a rotatable driven element, clutch members engageable to connect the driving element to drive the driven element, an operating member rotatable relatively to the driven element, means actuated by rotation of the operating member to engage the clutch members, a pair of spiral springs for rotating the operating member, said springs having their inner ends connected to the driven element at points diametrically opposite its axis and their outer ends connected to the operating member at points diametrically opposite said axis, and means for snubbing the operating member to retard its rotation to disengage the clutch members.

14. In a clutch mechanism, a rotary driving element, a rotatable shaft, clutch members engageable to connect the driving element to drive the shaft, an operating member rotatable with and relatively to the shaft, means actuated by relative rotation of the operating member to engage the clutch members, a pair of springs for rotating the operating member, said springs having their inner ends connected to the shaft on diametrically opposite sides thereof and their outer ends connected to the operating member at points diametrically opposite its axis, and means for retarding the rotation of the operating member with the driven member to cause it to disengage the clutch members.

15. In a clutch mechanism, a rotary driving element, a rotatable driven element, clutch members engageable to connect the driving element to rotate the driven element, an operating member carried by the driven member and rotatable relatively thereto, means actuated by the relative rotation of the operating member to engage the clutch members, resilient means for rotating the operating member relatively to the driven element, braking means for retarding the rotation of the operating member with the driven element to cause it to disengage the clutch members, auxiliary braking means engageable with the driven element to arrest its rotation, and means to connect the first braking means to actuate the auxiliary braking means with the braking forces controlled in relative predetermined magnitude.

16. In a clutch mechanism, a rotary driving element, a rotatable driven element, clutch members engageable to connect the driving element to rotate the driven element, an operating member rotatable relatively to the driven element, means actuated by the relative rotation of said operating member to engage the clutch members. resilient means to rotate the operating member relatively to the driven element, a brake for retarding the rotation of the operating member to disengage the clutch members, and a second brake connected for operation by the first brake to arrest the rotation of the driven element in predetermined sequence after the clutch members have been disengaged whereby to prevent reverse rotation of the driven element which would cause re-engagement of the clutch members.

17. In a clutch mechanism, a rotary driving element, a rotatable driven element, clutch members engageable to connect the driving element to rotate the driven element, an operating member rotatable relatively to the driven element to engage the clutch members, resilient means for rotating the operating member relatively to the driven element, a brake band engageable with the operating member to resist its rotation to effect release of the clutch members, a second brake band engageable with the driven element, and a lever connecting the ends of the brake bands and adapted to actuate the second brake band upon engagement of the first brake band with the operating member.

18. In a clutch mechanism, a rotary driving element, a rotatable driven element, clutch members engageable to connect the driving element to rotate the driven element, an operating member rotatable relatively to the driven element to engage the clutch members, resilent means for rotating the operating member relatively to the driven element, a brake band engageable with the operating member to retard its rotation relatively to the driven element and cause release of the clutch members, manually operable means connected to one end of the brake band, a lever connected to the opposite end of said brake band, a brake drum connected to the driven element, and a second brake band fixedly anchored at one end and connected at its opposite end to said lever at a point a greater distance from its axis than that of the first brake band, said second brake band being operative on the brake drum connected to the driven element to arrest the rotation of said driven element.

19. In a clutch mechanism, a rotary driving element, a rotatable driven element, clutch members engageable to connect said driving and driven element, an operating member rotatable relatively to the driven element to engage the clutch members, resilient means for rotating the operating member relatively to the driven member, a brake band engageable with the operating member to retard its rotation to release the clutch members, a lever having its shorter arm connected to the end of said brake band, means connected to the opposite end of the brake band for tightening it to engage the operating member, a brake drum fast with the driven element, and a brake band engageable with said drum, one end of said last named brake band fixedly anchored and its opposite end connected to the longer arm of said lever.

WILBERT M. GILMAN.

REFERENCES CITED

The following references are of record in the file of this patent:

UNITED STATES PATENTS

| Number | Name | Date |
| --- | --- | --- |
| 1,974,390 | Eason | Sept. 18, 1934 |
| 2,299,621 | Griffen | Oct. 20, 1942 |